(12) United States Patent
Iwamoto

(10) Patent No.: US 12,111,380 B2
(45) Date of Patent: Oct. 8, 2024

(54) MEASUREMENT APPARATUS, MEASUREMENT METHOD, AND RECORDING MEDIUM

(71) Applicant: Panasonic Intellectual Property Management Co., Ltd., Osaka (JP)

(72) Inventor: Daishi Iwamoto, Kanagawa Ken (JP)

(73) Assignee: PANASONIC AUTOMOTIVE SYSTEMS CO., LTD., Kanagawa (JP)

(*) Notice: Subject to any disclaimer, the term of this patent is extended or adjusted under 35 U.S.C. 154(b) by 102 days.

(21) Appl. No.: 17/884,262

(22) Filed: Aug. 9, 2022

(65) Prior Publication Data
US 2023/0067278 A1    Mar. 2, 2023

(30) Foreign Application Priority Data
Sep. 1, 2021    (JP) .................................. 2021-142775

(51) Int. Cl.
*G01S 11/02*    (2010.01)
*H04W 24/08*    (2009.01)

(52) U.S. Cl.
CPC ............. *G01S 11/02* (2013.01); *H04W 24/08* (2013.01)

(58) Field of Classification Search
CPC ............................... G01S 11/02; H04W 24/08
USPC .............................. 342/458, 21, 51, 432, 176
See application file for complete search history.

(56) References Cited

U.S. PATENT DOCUMENTS

| 7,030,808 B1* | 4/2006 | Repperger | G01S 7/285 342/162 |
| 2011/0068980 A1* | 3/2011 | Vered | H01Q 25/02 342/432 |
| 2018/0375594 A1* | 12/2018 | Kildal | H04B 17/29 |

FOREIGN PATENT DOCUMENTS

| JP | H05-302817 A | 11/1993 |
| JP | H08-101022 A | 4/1996 |
| JP | 2019-505768 A | 2/2019 |

* cited by examiner

*Primary Examiner* — Bo Fan
(74) *Attorney, Agent, or Firm* — Greenblum & Bernstein, P.L.C.

(57) ABSTRACT

A measurement apparatus outputs a correction result obtained by performing correction on a target radio wave received by a measurement mechanism which includes an antenna for receiving the target radio wave and a support member for supporting the antenna. The measurement apparatus acquires a first received radio wave phase being a phase of the target radio wave received by the antenna from a target. The measurement apparatus calculates an ideal phase of the target radio wave at each position of the antenna. The measurement apparatus acquires a second received radio wave phase being a phase of the target radio wave received by the antenna from the target at each position of the antenna. The measurement apparatus performs correction based on distortion of the support member, which is calculated from a difference between the ideal phase and the second received radio wave phase.

7 Claims, 5 Drawing Sheets

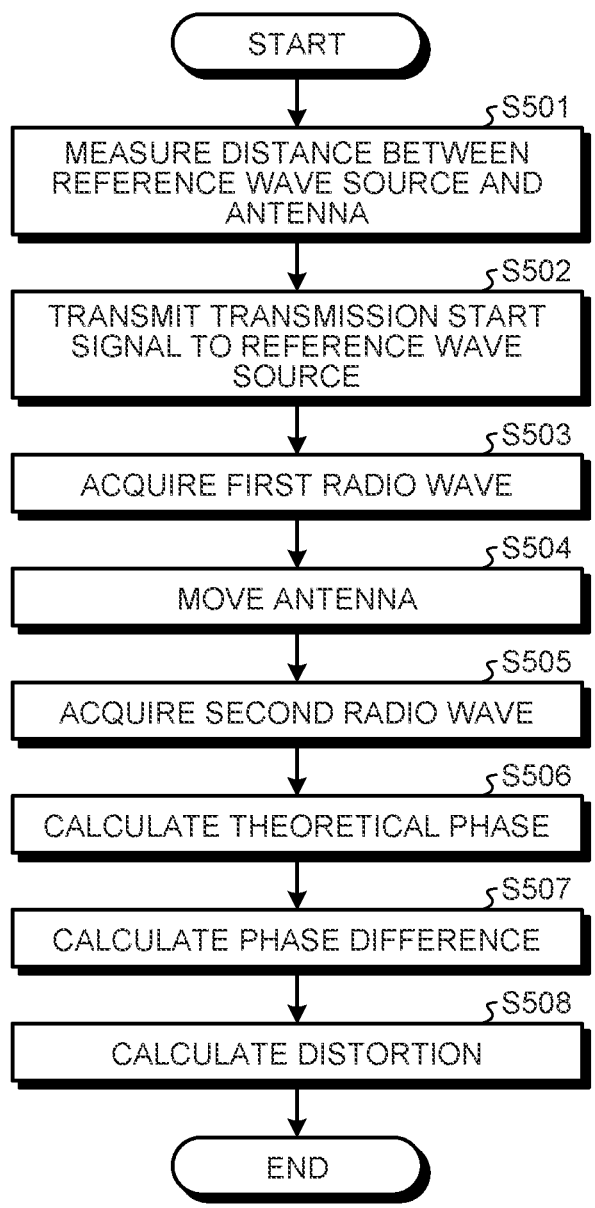

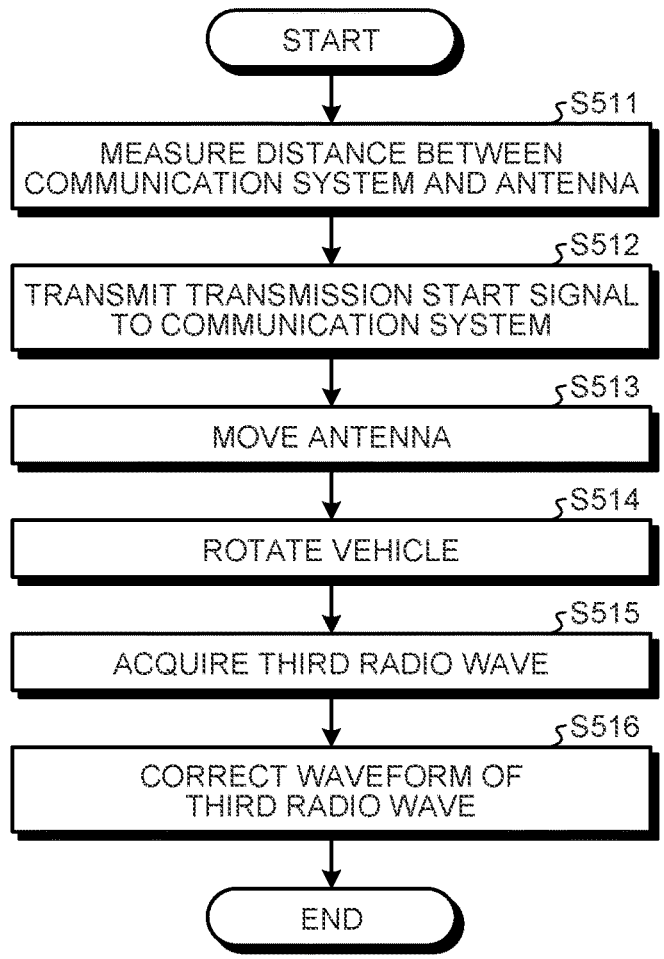
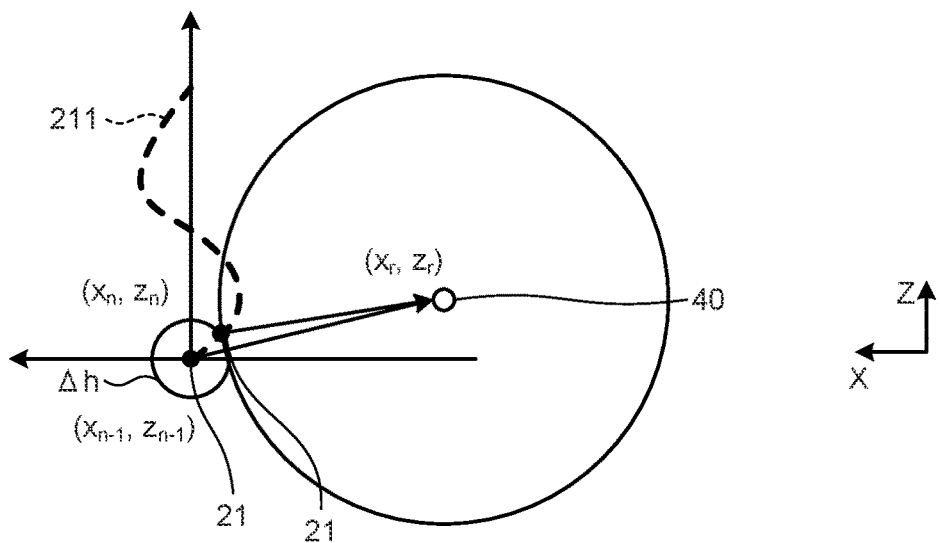

MEASUREMENT APPARATUS, MEASUREMENT METHOD, AND RECORDING MEDIUM

CROSS-REFERENCE TO RELATED APPLICATIONS

This application is based upon and claims the benefit of priority from Japanese Patent Application No. 2021-142775, filed on Sep. 1, 2021, the entire contents of which are incorporated herein by reference.

FIELD

The present disclosure relates generally to a measurement apparatus, a measurement method, and a recording medium.

BACKGROUND

There is a known system which receives a radio wave emitted from a communication system mounted on a target, such as a mobile phone or a vehicle, by an antenna and measures communication performance of the communication system on the basis of the radio wave received (for example, JP 2019-505768 A). In a case where a measurement target is large in size, a large-sized measurement system is introduced to receiving a radio wave while shifting an antenna by a movable unit included in such a large-sized measurement system. In addition, a distortion detector that detects distortion in a mechanism has been known (for example, JP H5-302817).

However, for example, in a case of a large-sized measurement system including a measurement mechanism made by a non-metal material, distortion may occur in this measurement mechanism. A detector can detect distortion by emitting laser light in order to detect the distortion. However, when the distortion detector is applied to a conventional measurement system, the distortion detector using the laser light becomes a reflection object of a radio wave to be measured. Thus, the distortion detector using the laser light interferes with the measurement, and it has been difficult to measure the communication performance of the communication system with high accuracy. In other words, when a measurement apparatus for measuring the radio wave is equipped with the large-sized measurement mechanism, there is room for improving detection of the distortion of the mechanism.

SUMMARY

A measurement apparatus according to the present disclosure outputs a correction result obtained by performing correction on a target radio wave received by a measurement mechanism including an antenna for receiving the target radio wave and a support member for supporting the antenna. The correction is performed on the basis of distortion of the support member. The measurement apparatus includes a hardware processor connected to a memory and configured to function as a first acquisition unit, a calculation unit, a second acquisition unit, and a correction unit. The first acquisition unit serves to acquire, on the basis of a reference positional relationship between the antenna and a target transmitting the target radio wave, a first received radio wave phase indicating a radio wave phase of the target radio wave received by the antenna from the target. The calculation unit serves to calculate, on the basis of the first received radio wave phase, an ideal received radio wave phase at each position of the antenna. The ideal received radio wave phase indicates an ideal radio wave phase of the target radio wave received by the antenna from the target. The second acquisition unit serves to acquire a second received radio wave phase at each position of the antenna. The second received radio wave phase indicates a radio wave phase of the target radio wave received by the antenna from the target. The correction unit serves to perform correction based on distortion information indicating the distortion of the support member. The distortion information is calculated from a phase difference between the ideal received radio wave phase calculated by the calculation unit and the second received radio wave phase acquired by the second acquisition unit.

BRIEF DESCRIPTION OF THE DRAWINGS

FIG. 5 is a flowchart illustrating an example of a process flow executed by the measurement apparatus according to the first embodiment;

FIG. 6 is a flowchart illustrating an example of the process flow executed by the measurement apparatus according to the first embodiment;

FIG. 7 is a diagram illustrating an example of position coordinates of an antenna and a target according to a second embodiment;

DETAILED DESCRIPTION

Hereinafter, embodiments of a measurement apparatus, a measurement method, and a recording medium according to the present disclosure will be described with reference to the accompanying drawings.

First Embodiment

Figure 1:
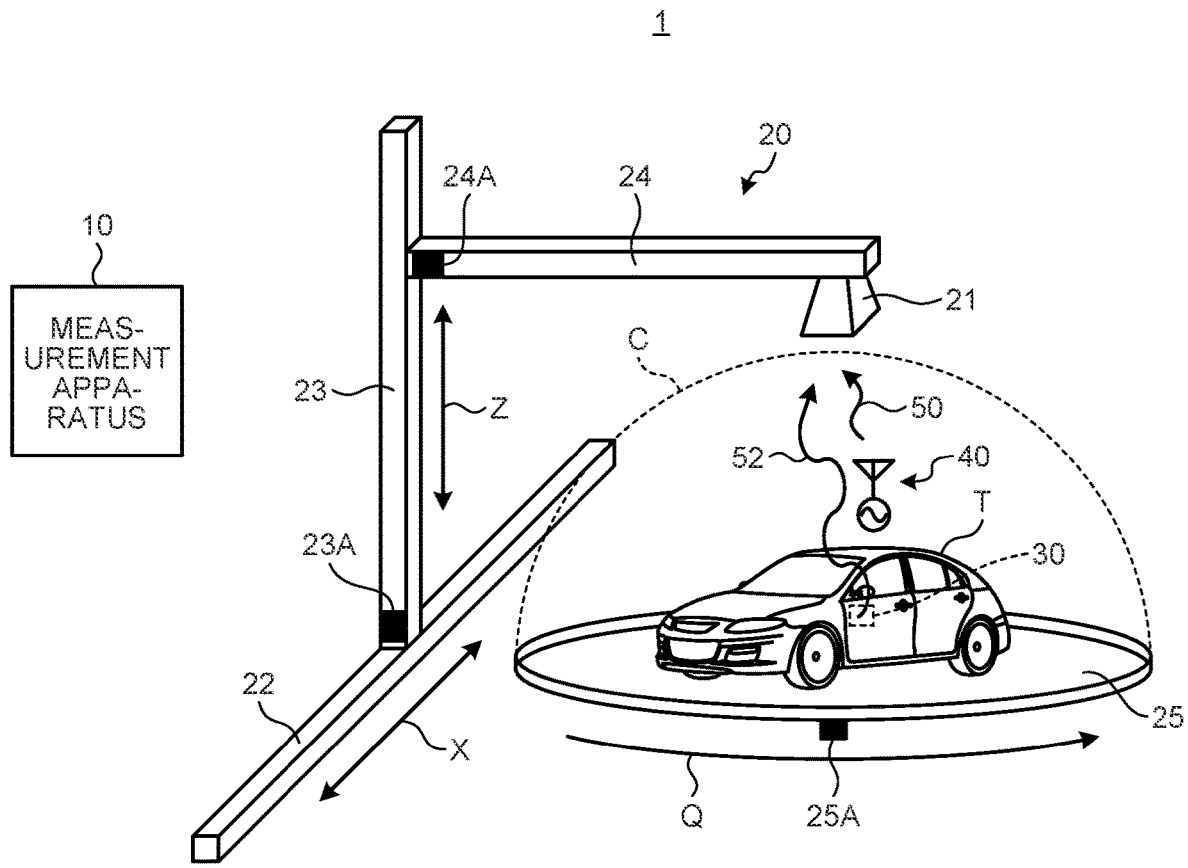
FIG. 1 is a schematic diagram illustrating an example of a measurement system according to a first embodiment.

FIG. 1 is a schematic diagram illustrating an example of a measurement system 1 according to a first embodiment. The measurement system 1 includes a measurement apparatus 10, a measurement mechanism 20, and a reference wave source 40.

The measurement system 1 is a system for measuring communication performance of a communication system 30 mounted on a target.

The target refers to an object that transmits a target radio wave. The target may be any object as long as the communication system 30 can be mounted. For example, the target is a vehicle T, a flying object such as an airplane, a ship, a structure such as a building, a mobile terminal, or an electronic apparatus such as a personal computer. In the present embodiment, as an example, the target is the vehicle T in the description.

The communication system 30 is a radio wave transmitter that wirelessly transmits measurement target radio wave 52. In other words, the communication system 30 is the radio wave transmitter that emits the measurement target radio wave 52 into the air. The communication system 30 is, for example, a cordless telephone device, a wireless communication device such as a wireless fidelity (Wi-Fi) router, or a radar transmitter. Moreover, the communication system 30 is, for example, various transmitters used for tracking, detection, or communication.

The measurement target radio wave 52 is a radio wave wirelessly transmitted from the communication system 30. The measurement target radio wave 52 is a radio wave to be measured in the measurement system 1 in the present embodiment. The measurement target radio wave 52 may be any of a millimeter wave, a microwave, an ultra-high frequency wave, a very high frequency wave, a high frequency wave, a medium frequency wave, and a low frequency wave. The millimeter wave is a radio wave in a millimeter wave frequency band that is a frequency band of 26 GHz or above. The millimeter wave is used for a mobile communication system such as a fifth generation mobile communication system (5G), an automatic driving technology of the vehicle T, an advanced driver assistance system (ADAS) technology, and the like. The radio wave used in the ADAS technology includes, for example, a radar wave.

In the present embodiment, the communication system 30 is mounted on the vehicle T as the example of the target. In the present embodiment, a mode in which the communication system 30 is mounted on the vehicle T will be described as an example.

The measurement mechanism 20 is a mechanism for receiving the measurement target radio wave 52 transmitted from the communication system 30 mounted on the vehicle T. The measurement mechanism 20 is configured to be at least partially movable so that the measurement target radio wave 52 at each position in all directions of the vehicle T can be received.

Specifically, the measurement mechanism 20 includes an antenna 21, a support member 22, a support member 23, and a support member 24.

The antenna 21 is a device that wirelessly receives the radio wave and wirelessly transmits the radio wave. In other words, the antenna 21 radiates the radio wave into the air and receives the radio wave propagating in the air.

The antenna 21 is supported by the support member 24. The support member 24 is a rod-shaped member. The antenna 21 is supported by one end of the support member 24 in a longitudinal direction, and the other end of the support member 24 is supported by the support member 23. The present embodiment describes the example that the support member 24 is arranged such that the longitudinal direction of the support member 24 substantially coincides with a direction intersecting the vertical direction.

The support member 23 is a rod-shaped member. In the present embodiment, the support member 23 is arranged such that, as an example, the longitudinal direction of the support member 23 substantially coincides with the vertical direction. One end of the support member 23 in the longitudinal direction is supported by the support member 22.

The support member 22 is a rod-shaped member provided on the ground or the like. The present embodiment describes, as an example, the mode in which the longitudinal direction of the support member 22 substantially coincides with the horizontal direction.

A support member 25 is a member that supports the vehicle T. In the present embodiment, the support member 25 is a disk-shaped member. In the present embodiment, the disk-shaped board surface of the support member 25 is arranged in a direction along the horizontal. A drive unit 25A is provided at a disk center of the support member 25.

The drive unit 25A is driven under the control of the measurement apparatus 10 as described later. By driving the drive unit 25A, the support member 25 pivots on the disk center at a predetermined angle (in the direction of an arrow Q). As the support member 25 rotates, the vehicle T placed on the support member 25 rotates (in the direction of the arrow Q). The arrow Q depicted in FIG. 1, toward which the support member 25 rotates, may also be in an opposite direction to the depicted direction of the arrow Q.

The support member 23 is provided with a drive unit 23A. The support member 24 is provided with a drive unit 24A. The drive unit 23A and the drive unit 24A are driven under the control of the measurement apparatus 10 described later. The support member 23 moves in the longitudinal direction (arrows in direction X) of the support member 22 by driving the drive unit 23A. The support member 24 moves in the longitudinal direction (arrows in direction Z) of the support member 23 by driving the drive unit 24A.

The antenna 21 supported by the support member 24 is movably supported in a direction approaching or separating from the vehicle T in the vertical direction and in a direction approaching or separating from the vehicle T in a direction intersecting the vertical direction by driving the drive unit 23A and the drive unit 24A. In other words, the antenna 21 is supported such that the antenna 21 is able to move between an apex of a hemisphere C centering the vehicle T as the center of the sphere and a periphery of the hemisphere C, by the drive of the drive unit 23A and the drive unit 24A.

The reference wave source 40 refers to a transmission source of radio wave used to calculate distortion in the measurement mechanism 20. The reference wave source 40 is installed at the center of the support member 25. The radio wave transmitted from the reference wave source 40 is a radio wave whose wavelength, cycle, and amplitude are known. The reference wave source 40 is, for example, a dipole antenna. In the present embodiment, the distortion of the measurement mechanism 20 is described as the distortion of the support member 23, but it is not limited to this example. Moreover, the present embodiment describes, as an example, the mode in which the target is the reference wave source 40 in addition to the vehicle T.

A transmission radio wave 50 transmitted from the reference wave source 40 is a fixed radio wave whose wavelength, cycle, and amplitude do not change with time. The cycle refers to oscillation or frequency.

Next, the measurement apparatus 10 will be described. The measurement apparatus 10 is an apparatus that measures communication performance of the communication system 30 on the basis of the measurement target radio wave 52 of the communication system 30 received by the antenna 21. The measurement apparatus 10 outputs a correction result obtained by performing, on the basis of the distortion of the support member 24, correction on the target radio wave received by the measurement mechanism 20. The measurement mechanism 20 includes the antenna 21 for receiving the target radio wave, and the support member 24 for supporting the antenna 21. Details of the measurement apparatus 10 will be described later.

Example of Hardware Configuration of Measurement Apparatus

Figure 2:
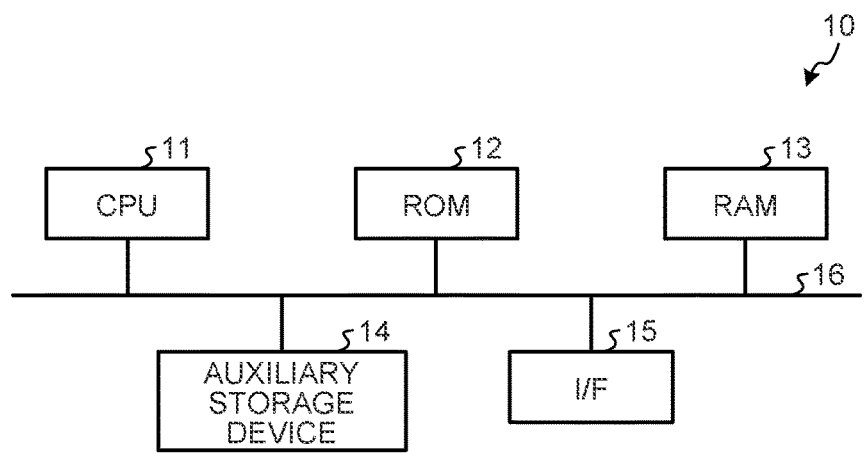
FIG. 2 is a hardware configuration diagram illustrating an example of a measurement apparatus according to the first embodiment.

FIG. 2 is a diagram illustrating an example of a hardware configuration of the measurement apparatus 10 according to the present embodiment. As illustrated in FIG. 2, the measurement apparatus 10 has the hardware configuration using a normal computer, in which a central processing unit (CPU) 11, a read only memory (ROM) 12, a random access memory (RAM) 13, an auxiliary storage device 14, and an external interface (I/F) 15 are connected to one another by a bus 16.

The CPU 11 is an arithmetic device that controls the measurement apparatus 10. Note that the CPU 11 is an example of a hardware processor in the measurement apparatus 10 of the present embodiment, whereas other processors or processing circuits may be provided instead of the CPU 11. The ROM 12 is a nonvolatile memory and stores various pieces of data (information written in a manufacturing stage of the measurement apparatus 10) including a program for activating the measurement apparatus 10.

The RAM 13 is, for example, a main storage device of the measurement apparatus 10, and stores data necessary for various processes by the CPU 11. The auxiliary storage device 14 stores various pieces of data such as a program executed by the CPU 11. The auxiliary storage device 14 includes, for example, a hard disc drive (HDD), or a solid state drive (SSD). The external I/F 15 is an interface for transmitting and receiving data. Moreover, the external I/F 15 is an interface for connecting (communicating) with an external device such as the antenna 21, the drive unit 23A, the drive unit 24A, the drive unit 25A, the communication system 30, and the reference wave source 40.

Functional Example of Measurement Apparatus

Figure 3:
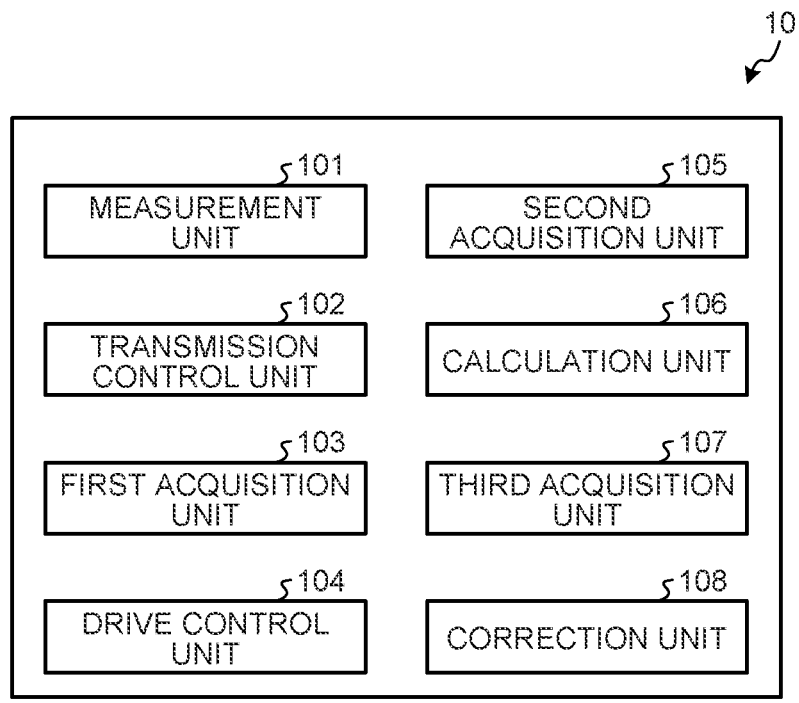
FIG. 3 is a functional block diagram illustrating an example of the measurement apparatus according to the first embodiment.

FIG. 3 is a block diagram illustrating an example of functions of the measurement apparatus 10 according to the present embodiment. As illustrated in FIG. 3, the measurement apparatus 10 of the present embodiment includes a measurement unit 101, a transmission control unit 102, a first acquisition unit 103, a drive control unit 104, a second acquisition unit 105, a calculation unit 106, a third acquisition unit 107, and a correction unit 108. However, the functional units of the measurement apparatus 10 are not limited to the above-listed ones.

The measurement unit 101 measures a reference positional relationship between the antenna 21 and the communication system 30. Specifically, the antenna 21 is provided on the support member 24, the communication system 30 is arranged on the support member 25, and positions of the antenna 21 and the communication system 30 arranged are measured. For example, the reference positional relationship includes coordinates indicating positions of the antenna 21 and the communication system 30, and a distance connecting the antenna 21 and the communication system 30. The measurement unit 101 stores the reference positional relationship measured in the auxiliary storage device 14.

In addition, the measurement unit 101 measures a reference positional relationship between the antenna 21 and the reference wave source 40. Specifically, the antenna 21 is provided on the support member 24, and the reference wave source 40 is provided at the center of the support member 25 as reference arrangement. Then, positions of the antenna 21 and the reference wave source 40 in the reference arrangement are measured. The reference positional relationship includes, for example, coordinates indicating the positions of the antenna 21 and the reference wave source 40, and a distance between the antenna 21 and the reference wave source 40. The measurement unit 101 stores the reference positional relationship measured in the auxiliary storage device 14.

The transmission control unit 102 controls transmission start and transmission stop of the radio waves with respect to the communication system 30 and the reference wave source 40.

Specifically, the transmission control unit 102 cooperates with the external I/F 15 to transmit a transmission start signal indicating the transmission start of the measurement target radio wave 52 to the communication system 30. Upon receiving the transmission start signal for the measurement target radio wave 52, the communication system 30 starts wireless transmission of the measurement target radio wave 52. Additionally, the transmission control unit 102 cooperates with the external I/F 15 to transmit a transmission stop signal indicating the transmission stop of the measurement target radio wave 52 to the communication system 30. Upon receiving the transmission stop signal for the measurement target radio wave 52, the communication system 30 stops transmission of the measurement target radio wave 52.

In addition, the transmission control unit 102 cooperates with the external I/F 15 to transmit a transmission start signal indicating the transmission start of the transmission radio wave 50 to the reference wave source 40. Upon receiving the transmission start signal for the transmission radio wave 50, the reference wave source 40 starts wireless transmission of the transmission radio wave 50. The transmission control unit 102 cooperates with the external I/F 15 to transmit a transmission stop signal indicating the transmission stop of the transmission radio wave 50 to the reference wave source 40. Upon receiving the transmission stop signal for the transmission radio wave 50, the reference wave source 40 stops transmission of the transmission radio wave 50.

Note that the communication system 30 and the reference wave source 40 may each be configured to switch between the transmission start and the transmission stop of the transmission radio wave 50 and between the transmission start and the transmission stop of the measurement target radio wave 52 in accordance with manual operation or the like by the user.

The first acquisition unit 103 acquires, on the basis of the reference positional relationship between the antenna 21 and the target transmitting the target radio wave, a first received radio wave phase indicating a radio wave phase of the target radio wave received by the antenna 21 from the target.

Specifically, when the transmission control unit 102 causes the reference wave source 40 to start transmission of the radio wave, the first acquisition unit 103 starts to receive the transmission radio wave 50 by the antenna 21. In addition, on the basis of the reference positional relationship between the antenna 21 and the reference wave source 40 arranged, the first acquisition unit 103 receives, by the antenna 21, the transmission radio wave 50 transmitted from the reference wave source 40 in response to receiving the transmission start signal for the transmission radio wave 50 from the transmission control unit 102.

Moreover, when the transmission control unit 102 causes the reference wave source 40 to stop transmission of the radio wave, the first acquisition unit 103 stops reception of the transmission radio wave 50 by the antenna 21. The first acquisition unit 103 then acquires the first received radio wave phase indicating a phase of the transmission radio wave 50 received by the antenna 21. The first acquisition unit 103 stores the first received radio wave phase acquired in the auxiliary storage device 14. Note that the first acquisition unit 103 may store the first transmission radio wave received by the antenna 21 in the auxiliary storage device 14 every time the first transmission radio wave is received.

The drive control unit 104 performs drive control of the drive unit 23A, the drive unit 24A, and the drive unit 25A. For example, the drive control unit 104 drives the drive unit 23A, the drive unit 24A, and the drive unit 25A such that the antenna 21 is sequentially positioned in each region, which is obtained by dividing the outer periphery of the hemisphere C (see FIG. 1) centering the vehicle T into a plurality of regions.

Specifically, the drive control unit 104 controls the drive unit 25A every time a position of the antenna 21 is controlled by cooperating with the drive unit 23A and the drive unit 24A to be moved to a next measurement position between the vertex of the hemisphere C and the periphery of the hemisphere C. The drive control unit 104 rotates the vehicle T placed on the support member 25 at a predetermined rotation angle by controlling the drive unit 25A.

In the measurement apparatus 10, every time the antenna 21 is moved to the next measurement position by the drive control of the drive control unit 104 and the vehicle T placed on the support member 25 is rotated at the predetermined rotation angle, the communication performance of the communication system 30 is derived using the received measurement radio wave of the measurement target radio wave 52 received by the antenna 21. Specifically, the measurement apparatus 10 is configured to be able to acquire the received measurement radio wave received in each region obtained by dividing the outer periphery into the plurality of regions along the outer periphery of the hemisphere C centering the vehicle T. The measurement apparatus 10 is configured so that the measurement radio wave received at each position in all directions of the vehicle T can be acquired.

The second acquisition unit 105 acquires a second received radio wave phase indicating a radio wave phase of the target radio wave received by the antenna 21 from the target.

Specifically, when the transmission control unit 102 causes the reference wave source 40 to start transmission of the radio wave, the second acquisition unit 105 starts to receive the transmission radio wave 50 by the antenna 21. Every time the position of the antenna 21 is controlled to be moved to the next measurement position between the vertex of the hemisphere C and the periphery of the hemisphere C by the drive control of the drive control unit 104 in cooperation with the drive unit 23A and the drive unit 24A, the second acquisition unit 105 receives, by the antenna 21, the transmission radio wave 50 transmitted from the reference wave source 40 that has received from the transmission control unit 102 the transmission start signal for the transmission radio wave 50.

Moreover, when the transmission control unit 102 causes the reference wave source 40 to stop transmission of the radio wave, the second acquisition unit 105 stops reception of the transmission radio wave 50 by the antenna 21. The second acquisition unit 105 then acquires the second received radio wave phase indicating the phase of the transmission radio wave 50 received by the antenna 21. In addition, the second acquisition unit 105 stores the second received radio wave phase acquired in the auxiliary storage device 14. The second acquisition unit 105 may store the second transmission radio wave received by the antenna 21 in the auxiliary storage device 14 every time the second transmission radio wave is received.

On the basis of the first received radio wave phase acquired by the first acquisition unit 103, the calculation unit 106 calculates, for each position of the antenna 21, an ideal received radio wave phase indicating an ideal radio wave phase of the target radio wave received by the antenna 21 from the target.

Specifically, when the calculation unit 106 acquires the first received radio wave phase acquired by the first acquisition unit 103, the calculation unit 106 calculates a transmitting and receiving distance between the target and each position of the antenna 21. The calculation unit 106 calculates, for each position of the antenna 21, the ideal received radio wave phase indicating the ideal radio wave phase of the target radio wave received by the antenna 21 from the target, on the basis of a distance connecting the antenna 21 and the reference wave source 40 measured by the measurement unit 101 (hereinafter, also referred to as a reference distance of a reference position) and the transmitting and receiving distance calculated.

Figure 4:
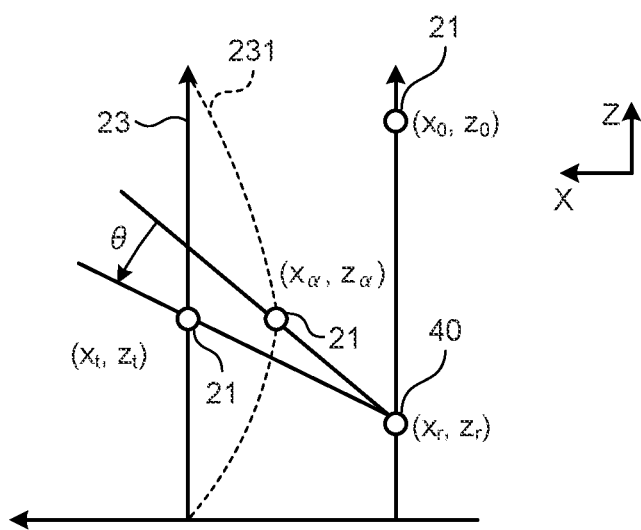
FIG. 4 is a diagram illustrating an example of distance information between an antenna and a target according to the first embodiment.

Here, the ideal received radio wave phase will be described with reference to FIG. 4. In the drawings explained below, the X and Z axes orthogonal to each other are illustrated for convenience, and the horizontal direction (X direction) and the vertical direction (Z direction) in the measurement mechanism 20 of the embodiment will be described using the X axis and the Z axis. In the following description, when simply described as the X direction or the Z direction, the X direction and the Z direction are axial directions, and each include two opposite directions. When a positive direction of the X axis is specified, this direction refers to one direction directed from right to left, and when a positive direction of the Z axis is specified, this direction refers to one direction directed from bottom to top.

When there is no distortion of the support member 23, a measured distance between the antenna 21 and the reference wave source 40, which is derived from the antenna 21 ($X_0$, $Z_0$) indicating the reference position coordinates and the reference wave source 40 ($X_t$, $Z_t$), does not change. When the measured distance between the antenna 21 and the reference wave source 40 does not change, a phase characteristic of the received radio wave received by the antenna 21 does not change. The phase of the received radio wave that does not change is referred to as the ideal received radio wave phase. The ideal received radio wave phase is also referred to as a theoretical phase. The theoretical phase is derived by Expression (1) below. Note that $R_0$ [m] represents the reference distance between the reference positions of the antenna 21 and the reference wave source 40. R [m] represents the transmitting and receiving distance between the antenna 21 and the reference wave source 40 in a case of no distortion. $S_0$ [deg] represents a phase of the reference positions of the antenna 21 and the reference wave source 40. λ [m] represents a wavelength.

$$\text{theoretical phase} = \frac{\pi}{4}(R - R_0) + S_0 \quad (1)$$

In addition, the calculation unit 106 calculates distortion information indicating distortion of the support member 23 from a phase difference indicating a difference between the ideal received radio wave phase calculated and the second received radio wave phase acquired by the second acquisition unit 105. The distortion information includes distance information indicating a distance between the antenna 21 and the target.

When the support member 23 is large in size, distortion may occur in part of the support member 23. Here, the distance information included in the distortion information indicating the distortion of the support member 23 will be described with reference to FIG. 4.

Coordinates ($X_t$, $Z_t$) indicate position coordinates of the antenna 21 in a case where there is no distortion of the support member 23. Coordinates ($X_\alpha$, $Z_\alpha$) indicate position coordinates of the antenna 21 with a support member 231 which represents the support member 23 having distortion. When distortion occurs in the support member 23, the measured distance between the antenna 21 and the reference wave source 40 derived from the reference position coordinates changes. When the measured distance changes, the phase characteristic of the received radio wave received by the antenna 21 changes. In other words, the measured phase indicating the phase of the received radio wave is different from the theoretical phase.

The calculation unit 106 can calculate distance information $L_1$ included in the following distortion information by calculating a difference between the measured phase and the theoretical phase: Phase difference S=(Measured phase)−(Theoretical phase). The distance information $L_1$ can be expressed by Expression (2) below.

$$L_1 = S \times \frac{\lambda}{\pi} \quad (2)$$

By calculating the phase difference S by the calculation unit 106 in this manner, the distortion information of the support member 23 can be obtained.

The description returns to FIG. 3. The third acquisition unit 107 acquires the received measurement radio wave indicating the measurement target radio wave 52 received by the antenna 21 from the target.

Specifically, first, when the transmission control unit 102 causes the communication system 30 to start transmission of the radio wave, the third acquisition unit 107 starts to receive the measurement radio wave by the antenna 21. In addition, every time the position of the antenna 21 is controlled to be moved to the next measurement position between the vertex of the hemisphere C and the periphery of the hemisphere C by the drive control of the drive control unit 104 in cooperation with the drive unit 23A and the drive unit 24A, the third acquisition unit 107 receives, by the antenna 21, the measurement target radio wave 52 transmitted from the communication system 30 mounted on the vehicle T placed on the support member 25 rotated at the predetermined rotation angle by the drive control unit 104.

Moreover, when the transmission control unit 102 causes the communication system 30 to stop transmission of the radio wave, the third acquisition unit 107 stops reception of the measurement radio wave by the antenna 21. The third acquisition unit 107 then acquires the received measurement radio wave received by the antenna 21. In addition, the third acquisition unit 107 stores the received measurement radio wave acquired in the auxiliary storage device 14.

The correction unit 108 performs correction based on the distortion information indicating the distortion of the support member 23 calculated from the phase difference S indicating the difference between the ideal received radio wave phase calculated by the calculation unit 106 and the second received radio wave phase acquired by the second acquisition unit 105.

Specifically, the correction unit 108 corrects the received measurement radio wave acquired by the third acquisition unit 107, on the basis of the distance information L, included in the distortion information calculated by the calculation unit 106. The correction unit 108 corrects, for example, at least one of the amplitude of the received measurement radio wave and the phase of the received measurement radio wave.

Details of the corrections on the amplitude of the received measurement radio wave and the phase of the received measurement radio wave will be described.

The amplitude of the received measurement radio wave is amplitude of power of the received measurement radio wave. The correction unit 108 corrects the amplitude of the power of the received measurement radio wave by adding, to the received measurement radio wave acquired by the third acquisition unit 107, a correction value derived by Expression (3) below which uses: the distance information L, on the distortion of the support member 23 calculated by the calculation unit 106, the transmitting and receiving distance R between the antenna 21 and the reference wave source 40 in the case of no distortion, and a free space propagation loss. The correction unit 108 stores the corrected amplitude of the power of the received measurement radio wave in the auxiliary storage device 14. The correction value can be expressed by Expression (3) below.

$$\text{correction value} = \left\{ 10\log_{10}\left(\left(\frac{(R+L_1)}{R}\right)^2\right) \right\} \quad (3)$$

The correction unit 108 corrects the phase of the received measurement radio wave by adding, to the received measurement radio wave acquired by the third acquisition unit 107, the phase correction value=$S \times f_2/f_1$ using: the phase difference S calculated by the calculation unit 106, the frequency $f_1$ of the reference wave source 40, and the frequency $f_2$ of the communication system 30. The correction unit 108 stores the corrected phase of the received measurement radio wave in the auxiliary storage device 14.

By correcting the measurement result using the phase difference S calculated in this manner, it is possible to perform highly accurate measurement.

Next, an example of a process flow executed by the measurement apparatus 10 according to the first embodiment will be described.

FIG. 5 is a flowchart illustrating an example of the process flow executed by the measurement apparatus 10. In a state immediately before the flowchart illustrated in FIG. 5 is executed, it is assumed that the reference wave source 40 is in a state of not transmitting the radio wave in the description.

The measurement unit 101 measures the reference positional relationship between the antenna 21 and the reference wave source 40 (Step S501).

The transmission control unit 102 transmits the transmission start signal indicating the transmission start of the transmission radio wave 50 to the reference wave source 40 (Step S502). The reference wave source 40, which has received the transmission start signal, starts transmission of the transmission radio wave 50.

On the basis of the reference positional relationship between the antenna 21 and the reference wave source 40 that transmits the transmission radio wave 50, the first acquisition unit 103 acquires the first received radio wave phase indicating the radio wave phase of the transmission radio wave 50 received by the antenna 21 from the reference wave source 40 (Step S503).

The drive control unit 104 starts the control to move the position of the antenna 21 to the measurement position between the vertex of the hemisphere C and the periphery of the hemisphere C in cooperation with the drive unit 23A and the drive unit 24A (Step S504).

Every time the position of the antenna 21 is controlled to move to the measurement position, the second acquisition unit 105 receives, by the antenna 21, the transmission radio wave 50 transmitted from the reference wave source 40 and acquires the second received radio wave phase indicating the phase of the received transmission radio wave 50 (Step S505).

The calculation unit 106 calculates the theoretical phase on the basis of: the reference distance between the antenna 21 and the reference wave source 40 measured by the measurement unit 101, the first received radio wave phase acquired by the first acquisition unit 103, and the transmitting the receiving distance R between the antenna 21 and the reference wave source 40 (Step S506).

In addition, the calculation unit 106 calculates the phase difference S from the difference between the second received radio wave phase acquired by the second acquisition unit 105 and the theoretical phase (Step S507).

Moreover, the calculation unit 106 calculates the distortion information of the support member 23 from the phase difference S (Step S508). When Step S508 ends, this process ends.

Next, FIG. 6 is a flowchart illustrating an example of a process flow executed by the measurement apparatus 10. In a state immediately before the flowchart illustrated in FIG. 6 is executed, it is assumed that the process in FIG. 5 is finished. Moreover, in the state immediately before the flowchart illustrated in FIG. 6 is executed, it is assumed that the communication system 30 is in a state of not transmitting the radio wave.

The measurement unit 101 measures the reference positional relationship between the antenna 21 and the communication system 30 (Step S511).

The transmission control unit 102 transmits the transmission start signal indicating the transmission start of the measurement target radio wave 52 to the communication system 30 (Step S512). The communication system 30, which has received the transmission start signal, starts transmission of the measurement target radio wave 52.

The drive control unit 104 starts the control to move the position of the antenna 21 to the measurement position between the vertex of the hemisphere C and the periphery of the hemisphere C in cooperation with the drive unit 23A and the drive unit 24A (Step S513). The drive control unit 104 controls the drive unit 25A every time the position of the antenna 21 is moved.

In addition, the drive control unit 104 controls the rotation of the vehicle T placed on the support member 25 at the predetermined rotation angle in cooperation with the drive unit 25A (Step S514).

The third acquisition unit 107 acquires the received measurement radio wave corresponding to the measurement target radio wave 52 transmitted from the communication system 30 and received by the antenna 21 (Step S515).

The correction unit 108 corrects the received measurement radio wave acquired by the third acquisition unit 107 on the basis of the distortion information calculated by the calculation unit 106 (Step S516). The correction unit 108 stores the corrected received measurement radio wave in the auxiliary storage device 14. When the correction unit 108 stores the corrected received measurement radio wave in the auxiliary storage device 14, this process ends.

As described above, the measurement apparatus 10 according to one aspect of the present disclosure acquires the first received radio wave phase indicating the phase of the radio wave received by the antenna 21, on the basis of the reference positional relationship between the antenna 21 and the target transmitting the target radio wave. In addition, the measurement apparatus 10 calculates, on the basis of the first received radio wave phase, the ideal received radio wave phase indicating the ideal radio wave phase of the target radio wave received by the antenna 21 from the target at each position of the antenna 21. The measurement apparatus 10 acquires the second received radio wave phase indicating the phase of the radio wave received by the antenna 21 at each position of the antenna 21. Then, the measurement apparatus 10 corrects the distortion information indicating the distortion of the support member 23 calculated from the phase difference S indicating the difference between the ideal received radio wave phase and the second received radio wave phase.

According to the present embodiment with this configuration, even in the state where distortion occurs in the support member 23 supporting the antenna 21, the distortion of the support member 23 is calculated from the phase difference S of the radio wave received by the antenna 21, whereby the communication performance of the communication system 30 can be measured with high accuracy.

Second Embodiment

A second embodiment will be described with reference to the drawings.

Next, the second embodiment will be described. Description of parts common to those of the above-described first embodiment will be omitted as appropriate. Note that components same as those in the first embodiment are given the same reference marks, and description thereof will be omitted as appropriate.

In the aforementioned first embodiment, the received measurement radio wave acquired by the third acquisition unit 107 is corrected on the basis of the phase difference S calculated by the calculation unit 106. In the second embodiment, the calculation unit 106 calculates the position coordinates of the support member 23 to correct contents of the drive control of the antenna 21 performed by the drive control unit 104.

Specifically, the distortion information calculated by the calculation unit 106 included in the measurement apparatus 10 according to the second embodiment includes position information indicating a distortion position of the support member 23. The position information will be described with reference to FIG. 7.

FIG. 7 is a diagram illustrating an example of position coordinates of the antenna 21 and the reference wave source 40.

First, the drive control unit 104 performs control to move the position of the antenna 21 in the Z direction at a predetermined interval $\Delta h$ in cooperation with the drive unit 23A. The predetermined interval $\Delta h$ indicates a movement distance of the antenna 21 in the Z direction. Note that a value of the predetermined interval $\Delta h$ is fixed. The predetermined interval $\Delta h$ can be expressed by Expression (4)

below using the n−1th position coordinates $(X_{n-1}, Z_{n-1})$ of the antenna 21 and the nth position coordinates $(X_n, Z_n)$ of the antenna 21.

$$\Delta h = \sqrt{(x_n + x_{n\_1})^2 + (z_n + z_{n\_1})^2} \quad (4)$$

When there is no distortion of the support member 23, the nth position coordinates $(X_n, Z_n)$ of the antenna 21 can be expressed by the n−1th position coordinates of the antenna 21 and the predetermined interval $\Delta h$: Position coordinates $(X_n, Z_n) = (X_{n-1}, Z_{n-1} + \Delta h)$. A path 211 indicates a movement trajectory of the antenna 21 in a state where there is distortion of the support member 23. In the state where distortion occurs in the support member 23, the antenna 21 moves in the X direction and the Z direction along the path 211. Thus, the nth position coordinates of nth antenna 21 cannot be expressed by the n−1th position coordinates of the antenna 21 and the predetermined interval $\Delta h$.

In the present embodiment, the calculation unit 106 calculates the distortion information of the support member 23 on the basis of the phase difference S between the first received radio wave phase acquired by the first acquisition unit 103 and the second received radio wave phase acquired by the second acquisition unit 105.

Specifically, on the basis of the reference positional relationship between the antenna 21 and the reference wave source 40 are arranged, the first acquisition unit 103 receives, by the antenna 21, the transmission radio wave 50 transmitted from the reference wave source 40 that has received from the transmission control unit 102 the transmission start signal for the transmission radio wave 50. Every time the position of the antenna 21 is controlled to move to the next measurement position between the vertex of the hemisphere C and the periphery of the hemisphere C by the drive control of the drive control unit 104 in cooperation with the drive unit 23A, the second acquisition unit 105 receives, by the antenna 21, the transmission radio wave 50 transmitted from the reference wave source 40 that has received from the transmission control unit 102 the transmission start signal for the transmission radio wave 50.

The second acquisition unit 105 receives the transmission radio wave 50 from the reference wave source 40 by the antenna 21 every time the position of the antenna 21 is controlled to move to the measurement position. Therefore, the second acquisition unit 105 can acquire the second received radio wave phase received at the n−1th time and the second received radio wave phase received at the nth time by the antenna 21. The calculation unit 106 can calculate a difference $L_2$ between the n−1th and nth transmitting and receiving distances, on the basis of the second received radio wave phase received at the n−1th time and the second received radio wave phase received at the nth time by the antenna 21.

The difference $L_2$ between the transmitting and receiving distance can be expressed by Expression (5) below using the n−1th position coordinates $(X_{n-1}, Z_{n-1})$ of the antenna 21, the nth position coordinates $(X_n, Z_n)$ of the antenna 21, and the position coordinates $(X_r, Z_r)$ of the reference wave source 40.

$$L_2 = \sqrt{(x_n - x_r)^2 + (z_n - z_r)^2} - \sqrt{(x_{n-1} - x_r)^2 + (z_{n-1} - z_r)^2} \quad (5)$$

The calculation unit 106 can calculate distortion coordinates of the support member 23 by using: the position coordinates $(X_0, Z_0)$ and $(X_r, Z_r)$ of the reference positions of the antenna 21 and the reference wave source 40 measured by the measurement unit 101, the calculated phase difference S. and solutions of simultaneous equations consisting of Expression (4) and Expression (5).

The correction unit 108 corrects the control contents related to the drive control of the antenna 21 driven and controlled by the drive control unit 104 on the basis of the position information calculated by the calculation unit 106. Specifically, the correction unit 108 corrects the coordinate information indicating the distortion coordinates of the support member 23 for the antenna 21 corresponding to the control contents. For example, when the position of the antenna 21 is shifted in the +X direction due to distortion of the support member 23, the correction is made to move in the −X direction. When the position of the antenna 21 is shifted in the −Z direction due to distortion of the support member 23, the correction is made to move in the +Z direction.

By correcting the movement coordinates of the antenna 21 in this manner, it is possible to perform highly accurate measurement without correcting the radio wave received by the antenna 21.

Figure 8:
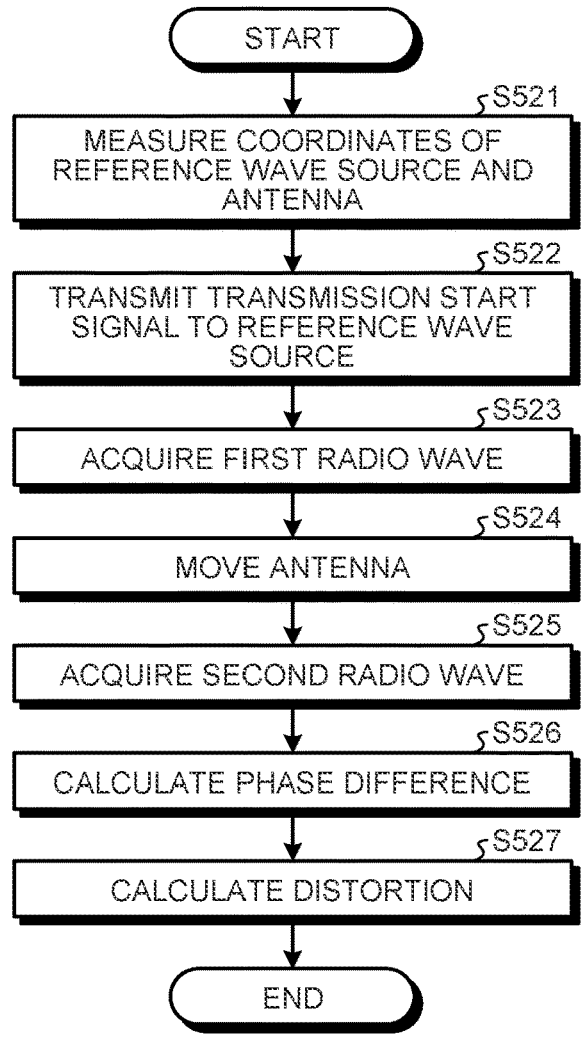
FIG. 8 is a flowchart illustrating an example of a process flow executed by a measurement apparatus according to the second embodiment.

FIG. 8 is a flowchart illustrating an example of a process flow executed by the measurement apparatus 10. In a state immediately before the flowchart illustrated in FIG. 8 is executed, it is assumed that the reference wave source 40 is in a state of not transmitting the radio wave in the description.

The measurement unit 101 measures the reference positional relationship between the antenna 21 and the reference wave source 40 (Step S521).

The transmission control unit 102 transmits the transmission start signal indicating the transmission start of the transmission radio wave 50 to the reference wave source 40 (Step S522). The reference wave source 40, which has received the transmission start signal, starts transmission of the transmission radio wave 50.

On the basis of the reference positional relationship between the antenna 21 and the reference wave source 40, the first acquisition unit 103 acquires the first received radio wave phase indicating the radio wave phase of the transmission radio wave 50 transmitted from the reference wave source 40 and received by the antenna 21 (Step S523).

The drive control unit 104 performs control to be moved to the position of the antenna 21 in the +Z direction at the predetermined interval $\Delta h$ in cooperation with the drive unit 23A (Step S524).

Every time the position of the antenna 21 is controlled to be moved to the measurement position, the second acquisition unit 105 acquires the second received radio wave phase indicating the phase of the transmission radio wave 50 transmitted from the reference wave source 40 and received by the antenna 21. (Step S525).

The calculation unit 106 calculates the phase difference S from a phase difference between the second received radio wave phase acquired by second acquisition unit 105 and the second received radio wave phase acquired immediately beforehand (Step S526).

Moreover, the calculation unit 106 calculates the distortion information of the support member 23 by using the position coordinates of the reference positions of the antenna 21 and the reference wave source 40 measured by the measurement unit 101 and the calculated phase difference S (Step S527). When Step S527 ends, this process ends.

Figure 9:
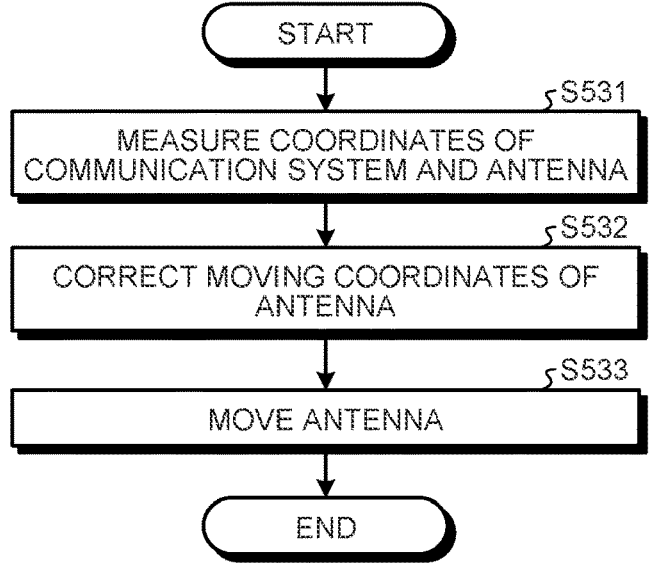
FIG. 9 is a flowchart illustrating an example of the process flow executed by the measurement apparatus according to the second embodiment.

Next, FIG. 9 is a flowchart illustrating an example of a process flow executed by the measurement apparatus 10. In a state immediately before the flowchart illustrated in FIG. 9 is executed, it is assumed that the process in FIG. 8 is finished. In the state immediately before the flowchart illustrated in FIG. 9 is executed, it is assumed that the communication system 30 is in a state of not transmitting the radio wave in the description.

The measurement unit 101 measures the reference positional relationship between the antenna 21 and the communication system 30 (Step S531).

The correction unit 108 corrects control of the drive unit 23A by the drive control unit 104 (Step S532).

The drive control unit 104 starts control to move the position of the antenna 21 to the measurement position between the vertex of the hemisphere C and the periphery of the hemisphere C on the basis of the control corrected by the correction unit 108, and controls the drive unit 25A every time the position of the antenna 21 is moved (Step S533). In addition, the drive control unit 104 controls rotational drive of the vehicle T placed on the support member 25 at the predetermined rotation angle in cooperation with the drive unit 25A. When the measurement of the communication system 30 ends, this process ends.

As described above, the measurement apparatus 10 according to one aspect of the present disclosure acquires the first received radio wave phase indicating the phase of the radio wave received by the antenna 21 on the basis of the reference positional relationship between the antenna 21 and the target transmitting the target radio wave. In addition, the measurement apparatus 10 acquires the second received radio wave phase indicating the phase of the radio wave received by the antenna 21 at each position of the antenna 21. The measurement apparatus 10 calculates the position information indicating the distortion position of the support member 23 on the basis of the phase difference S between the first received radio wave phase and the second received radio wave phase. The measurement apparatus 10 corrects the control contents related to the drive control of the antenna 21 on the basis of the position information indicating the position of the distortion of the support member 23.

According to the present embodiment with the above-described configuration, even when the distortion occurs in the support member 23 that supports the antenna 21, the movement coordinates of the antenna 21 are corrected based on the position coordinates of the distortion of the support member 23 calculated from the phase difference S of the radio wave received by the antenna 21, whereby the communication performance of the communication system 30 can be measured with high accuracy.

A computer program causing the measurement apparatus 10 of the above embodiments to implement the above processes may be stored as a file in an installable format or an executable format in a computer-readable storage medium such as a CD-ROM, a CD-R, a memory card, a digital versatile disk (DVD), or a flexible disk (FD), and provided as a computer program product. In addition, the computer program causing the measurement apparatus 10 of the above embodiments to implement the above processes may be stored on a computer connected to a network such as the Internet and provided by being downloaded via the network. The computer program causing the measurement apparatus 10 of the above embodiments to implement the above processes may be provided or distributed via a network such as the Internet.

While certain embodiments have been described, these embodiments have been presented by way of example only, and are not intended to limit the scope of the inventions. Indeed, the novel methods and systems described herein may be embodied in a variety of other forms; moreover, various omissions, substitutions and changes in the form of the methods and systems described herein may be made without departing from the spirit of the inventions. The accompanying claims and their equivalents are intended to cover such forms or modifications as would fall within the scope and spirit of the inventions.

According to the measurement apparatus according to the present disclosure, it is possible to calculate the distortion in the measurement mechanism to perform highly accurate measurement of the communication performance of the communication system.

What is claimed is:

1. A measurement system, comprising:
   a measurement apparatus; and
   a measurement mechanism,
   wherein the measurement mechanism includes:
   an antenna, which, in operation, receives a target radio wave; and
   a support member in which the antenna is installed, a position of the antenna configured to be changed, and
   the measurement apparatus includes:
   a hardware processor; and
   a memory connected to the hardware processor and including instructions that, when executed by the hardware processor, cause the hardware processor to perform operations, the operations including:
   first acquiring, based on a reference positional relationship between the antenna and a target transmitting the target radio wave, a first received radio wave phase indicating a radio wave phase of the target radio wave received by the antenna from the target;
   calculating, based the first received radio wave phase, an ideal received radio wave phase at each position of the antenna changed by moving the support member, the ideal received radio wave phase indicating an ideal radio wave phase of the target radio wave received by the antenna from the target;
   second acquiring a second received radio wave phase at each position of the antenna changed by moving the support member, the second received radio wave phase indicating [a] the radio wave phase of the target radio wave received by the antenna from the target; and
   performing correction based on distortion information indicating a distortion of the support member, the distortion information being calculated from a phase difference between the ideal received radio wave phase calculated by the hardware processor in the calculating and the second received radio wave phase acquired by the hardware processor in the second acquiring.

2. The measurement system according to claim 1, wherein the operations further include:
   third acquiring a received measurement radio wave indicating a measurement target radio wave received by the antenna from the target,
   the distortion information includes distance information indicating a distance between the antenna and the target, and
   the hardware processor corrects, based on the distance information, the received measurement radio wave acquired by the hardware processor in the third acquiring.

3. The measurement system according to claim 2, wherein the hardware processor corrects at least one of an amplitude of the received measurement radio wave or a phase of the received measurement radio wave.

4. The measurement system according to claim 1, wherein the operations further include:
    performing drive control of the antenna,
    the distortion information includes position information indicating a position of the distortion of the support member, and
    the hardware processor corrects, based on the position information, control contents related to the drive control of the antenna which is driven and controlled by the hardware processor.

5. The measurement system according to claim 4, wherein the hardware processor corrects coordinate information indicating coordinates of the distortion of the support member for the antenna corresponding to the control contents.

6. A measurement method executed by a measurement system, the measurement system including a measurement apparatus and a measurement mechanism, the measurement method comprising:
    first acquiring, by the measurement apparatus, based on a reference positional relationship between an antenna included in the measuring mechanism and a target transmitting a target radio wave, a first received radio wave phase indicating a radio wave phase of the target radio wave received by the antenna from the target;
    calculating, by the measurement apparatus, based on the first received radio wave phase, an ideal received radio wave phase at each position of the antenna changed by moving a support member included in the measuring mechanism, the ideal received radio wave phase indicating an ideal radio wave phase of the target radio wave received by the antenna from the target;
    second acquiring, by the measurement apparatus, a second received radio wave phase at each position of the antenna changed by moving the support member, the second received radio wave phase indicating the radio wave phase of the target radio wave received by the antenna from the target; and
    performing, by the measurement apparatus, correction based on distortion information indicating a distortion of the support member, the distortion information being calculated from a phase difference between the ideal received radio wave phase and the second received radio wave phase.

7. A non-transitory computer-readable recording medium on which a measurement program including programmed instructions executed by a computer in a measurement system is recorded, the programmed instructions causing the computer to:
    first acquire, by the measurement apparatus, based on a reference positional relationship between an antenna included in the measuring mechanism and a target transmitting a target radio wave, a first received radio wave phase indicating a radio wave phase of the target radio wave received by the antenna from the target;
    calculate, by the measurement apparatus, based on the first received radio wave phase, an ideal received radio wave phase at each position of the antenna changed by moving a support member included in the measuring mechanism, the ideal received radio wave phase indicating an ideal radio wave phase of the target radio wave received by the antenna from the target;
    second acquire, by the measurement apparatus, a second received radio wave phase at each position of the antenna changed by moving the support member, the second received radio wave phase indicating the radio wave phase of the target radio wave received by the antenna from the target; and
    perform, by the measurement apparatus, correction based on distortion information indicating a distortion of the support member, the distortion information being calculated from a phase difference between the ideal received radio wave phase and the second received radio wave phase.

* * * * *